Patented Mar. 11, 1941

2,234,374

UNITED STATES PATENT OFFICE 2,234,374

ETHER ESTERS OF HALOGENATED SALICYLIC ACIDS

Ernest F. Grether and Russel B. Du Vall, Midland, Mich., assignors to The Dow Chemical Company, Midland, Mich., a corporation of Michigan No Drawing. Application November 9, 1939, Serial No. 303,704

4 Claims. (Cl. 260—474)

This invention concerns certain new ether-esters of halogenated salicylic acids having the general formula:

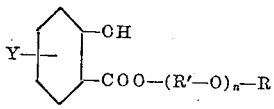

wherein R represents an alkyl, aryl, or substituted aryl radical, R' represents a lower alkylene radical containing at least two carbon atoms, $n$ is an integer, and Y represents a halogen atom, i. e. chlorine, bromine, or iodine.

The new compounds herein disclosed are useful as plasticizing agents for nitro-cellulose, cellulose acetate, and cellulose ether, e. g. ethyl-cellulose, compositions. They are compatible with such cellulose derivatives, are substantially non-volatile at room temperatures, are soluble or miscible in the usual solvents or solvent mixtures employed for dissolving cellulose derivatives, and do not readily decompose or discolor. Cellulose derivative compositions plasticized with our new compounds are suitable for use in the preparation of artificial leather, lacquers, Celluloid, films, various molded objects, etc.

The new ether-esters of the present class are conveniently prepared by esterifying a halogenated salicylic acid such as 5-bromo-salicylic acid, 4-iodo-salicylic acid, 6-chloro-salicylic acid, etc., with a mono-ether of glycol, e. g. ethylene glycol, diethylene glycol, propylene glycol, etc. The esterification is usually carried out by heating the halogenated salicylic acid with preferably more than its molecular equivalent of the glycol mono-ether and a small proportion, e. g. 0.02 to 0.06 molecular equivalents, of a strong acid, such as sulphuric or benzene sulphonic acid, to a temperature above 100° C., preferably between 120° and 150° C. The water formed in the reaction is preferably distilled from the mixture as it is formed. If desired a water-immiscible organic solvent such as benzene or toluene may be added for the purpose of promoting the distillation of water from the reaction mixture. The esterification is usually complete after from five to ten hours heating, although longer heating may sometimes be required. Upon completion of the reaction, the reacted mixture is treated with sufficient alkali to neutralize the acid contained therein, after which the ester product is separated and purified by fractional distillation under vacuum.

The following example will illustrate one way in which the principle of the invention has been applied, but is not to be construed as limiting the same.

Example 1

A mixture of 194 grams (0.89 mole) of 5-bromo-salicylic acid, 146 grams (1.62 moles) of ethylene glycol monoethyl ether, and 3.0 grams of benzene sulphonic acid was heated at 145°-150° C. for 10¾ hours in a flask fitted with a dropping funnel, condenser, and receiver. During the last 4½ hours of heating, benzene was added dropwise to facilitate the distillation of water from the reaction mixture. The reacted mixture was dissolved in benzene and washed with dilute aqueous sodium carbonate. The benzene was removed by distillation under vacuum, after which the product was dissolved in ethyl alcohol, from which it crystallized. There was obtained the beta-ethoxy-ethyl ester of 5-bromo-salicylic acid, a white, crystalline solid melting at 62° C. and having the formula

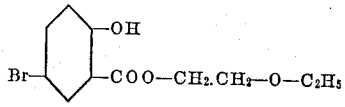

Other ether-esters of halogenated salicylic acid may be prepared by esterifying a halogenated salicylic acid with a glycol mono-ether in accordance with the procedure described above. For example, 4-chloro-salicylic acid may be reacted with the mono-phenyl ether of ethylene glycol to produce the beta-phenoxy-ethyl ester of 4-chloro-salicylic acid; 3-iodo-salicylic acid may be reacted with the mono-isopropyl ether of trimethylene glycol to produce the gamma-isopropoxy-propyl ester of 3-iodo-salicylic acid; 6-bromo-salicylic acid may be reacted with the tertiarybutyl ether of diethylene glycol to produce the beta-(beta-tertiarybutyl-ethoxy)-ethyl ester of 6-bromo-salicylic acid; 5-chloro-salicylic acid may be reacted with the ethyl ether of butylene glycol to produce the omega-ethoxy-butyl ester of 5-chloro-salicylic acid; 5-bromo-salicylic acid may be reacted with the mono-(2-xenyl) ether of ethylene glycol to produce the beta-(2-xenoxy)-ethyl ester of 5-bromo-salicylic acid; etc. All such products are suited to the uses hereinbefore mentioned.

This application is a continuation-in-part of our co-pending application, Serial No. 187,556, filed January 28, 1938, now U. S. Patent No. 2,198,583.

We claim:

1. A glycol ether-ester of a halogenated salicylic acid having the general formula

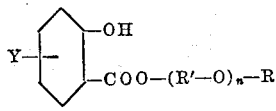

wherein Y represents a halogen substituent selected from the class consisting of chlorine, bromine, and iodine, R' represents a lower alkylene radical containing at least two carbon atoms, $n$ represents a small integer, and R represents a radical selected from the class consisting of alkyl and aryl radicals.

2. A glycol ether-ester of a halogenated salicylic acid having the general formula

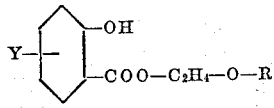

wherein Y represents a halogen substituent selected from the class consisting of chlorine, bromine, and iodine, and R represents a radical selected from the group consisting of alkyl and aryl radicals.

3. A glycol ether-ester of a halogenated calicylic acid having the general formula

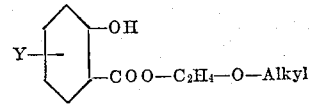

wherein Y represents a halogen substituent selected from the class consisting of chlorine, bromine, and iodine.

4. The beta-ethoxy-ethyl ester of 5-bromosalicylic acid, a white, crystalline solid melting at 62° C. and having the formula

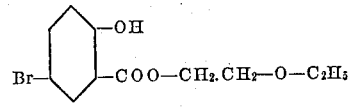

ERNEST F. GRETHER.
RUSSEL B. DU VALL.